Jan. 29, 1924.
G. C. CARHART
DIFFERENTIAL GEARING
Filed March 23, 1918
1,481,889
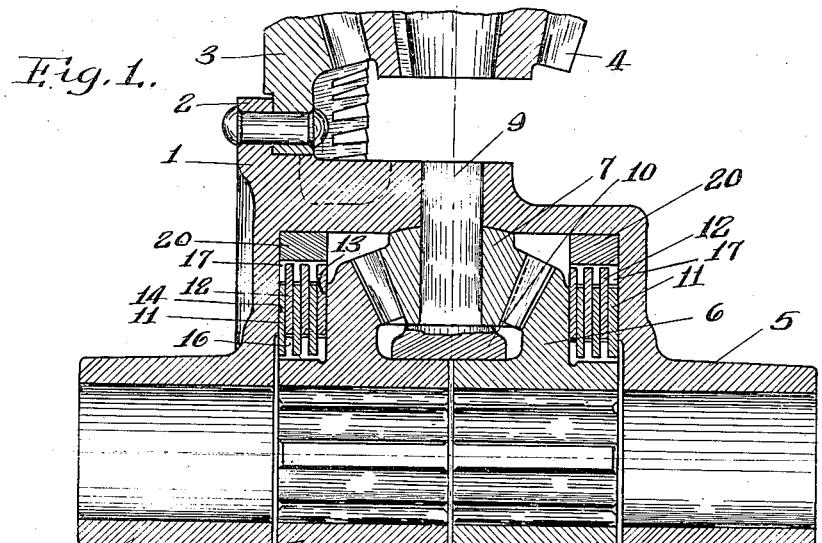
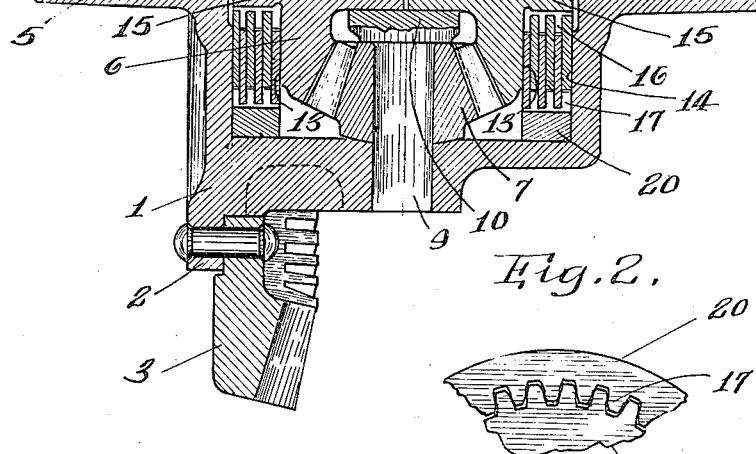
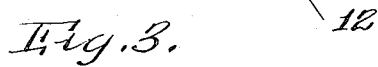
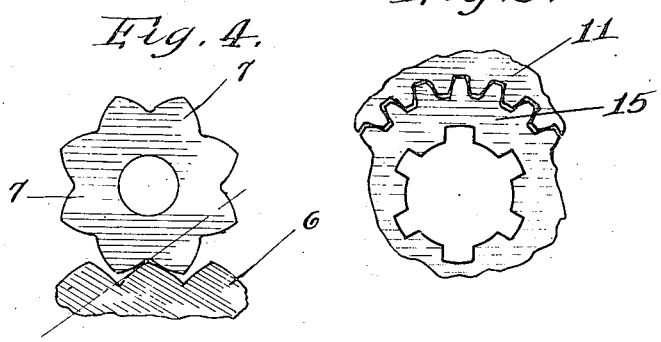
INVENTOR
George C. Carhart.
BY
Parsons & Pridill
ATTORNEYS Patented Jan. 29, 1924.

1,481,889

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

DIFFERENTIAL GEARING.

Application filed March 23, 1918. Serial No. 224,183.

*To all whom it may concern:*

Be it known that I, GEORGE C. CARHART, a citizen of the United States, and a resident of Syracuse, in the county of Onondaga and State of New York, have invented a certain new and useful Differential Gearing, of which the following is a specification.

This invention relates to differential gearing and has for its object a mechanism by which the compensating action of the gearing is retarded, which mechanism is particularly simple in construction and highly efficient and durable in use; and the invention consists in the novel features and in the combinations and constructions hereinafter set forth and claimed.

In describing this invention, reference is had to the accompanying drawings in which like characters designate corresponding parts in all the views.

Figure 1 is a transverse sectional view of a differential gearing embodying my invention.

Figures 2 and 3 are fragmentary elevations of the interleaved disks, and gear teeth with which they interlock.

Figure 4 is a diagram illustrating the pressure angle of the teeth of the gearing.

This differential gear comprises a casing, intermeshing gears having the pressure angles of their teeth abnormally large so as to force one of the gears axially during relative rotation of the gears, the casing and the axially movable gear having interleaved brake disks associated therewith which frictionally engage to retard the compensating action of the gearing when said gear is moved axially. I have here illustrated my invention as embodied in a differential gearing of the bevel gear type, and sets of interleaved disks are interposed between the main or opposing gears and the side walls or cheeks of the casing.

1 designates the casing of the gearing which may be of any suitable form, size and construction, it being usually formed of two sections suitably secured together along the vertical median plane thereof, in any well known manner.

One of the sections has a flange 2 to which is secured a gear ring 3 meshing with the driving gear 4. The sections are also provided with suitable external hubs 5 on which are mounted the main bearings which support the casing. The shaft sections which are connected to the driving wheels of the vehicle equipped with my differential gearing, extend into the hubs 5.

6 are the opposing main gears of the differential gearing and 7 are the compensating gears or pinions, the gears 6 and 7 being of the bevel type.

The gears 6 are provided with hubs mountable on the ends of the shaft sections located in the hubs 5 of the casing and are provided with non-circular or fluted bores for receiving complementally shaped ends of the driving axles of the vehicle.

The pinions 7 are mounted on studs or spindles 9 extending radially relatively to the gears 6 and fixed at their outer ends between the sections of the casing and having their inner ends secured to a ring or sleeve 10 encircling the opposing end portions of the hubs of the gears 6. The teeth of the gears 6 and pinions 7 are arranged with their abnormally large pressure angles and also with their pitch cones arranged at such angles that during relative rotation of the gears 6 and 7 the gears 6 are shifted or pressed axially outwardly.

11 and 12 are sets of interleaved disks interposed between opposing surfaces 13 and 14 of each main gear 6 and the opposing side wall of the casing, one set as 11 being interlocked with the contiguous gear 6 to rotate therewith and the other set 12 with the casing.

In the illustrated embodiment of my invention, each main gear 6 is provided with an external hub 15 formed with external spur gear teeth 16, and the casing is provided with internal annular spur gear teeth 17 opposed to and concentric with each set of spur gear teeth 16, and each disk 11 is formed with internal spur gear teeth 18 interlocked with the spur gear teeth 16 of the contiguous main gear 6; and each disk 12 is formed with external gear teeth 19 interlocked with the contiguous internal annular gear teeth 17. Preferably, the teeth 17 are provided on rings 20 which are fitted into the sections of the casing and secured in position in any suitable manner.

The angle of the pitch cone of the compensating pinion 7 in this embodiment of my invention, is less than that of the main gears 6 and hence owing to the abnormally large pressure angles of the intermeshing gear teeth, the main gears which are larger than the pinions and hence have a greater brake surface, tends to move axially during relative rotation of the gears 6 and pinions 7.

The friction between the disks is not sufficient to lock the main gears 6 to the casing but is sufficient to permit motion to be transmitted inefficiently to the outside wheel of a motor vehicle when the inside wheel lags as when making a turn.

Preferably, the pressure angles of the teeth of the gears are 50° and as this is considerably greater than the pressure angles now used which are usually 14½° or 20°, a braking force is created which retards but does not prevent the compensating action of the gearing.

What I claim is:

1. A differential gearing including a casing, and intermeshing gears in the casing, one of said gears being shiftable axially during relative rotation of the gears, the axially movable gear being provided with external spur gear teeth, a ring fitted in the casing and having internal spur gear teeth opposed to said external spur gear teeth, and interleaved disks between the axially shiftable gear and the opposing face of the casing, one set of disks having internal gear teeth interlocked with the spur gear teeth of the axially movable gear and the other set of disks having external spur gear teeth interlocked with the internal spur gear teeth of said ring, substantially as and for the purpose described.

2. A differential gearing comprising a casing, main opposing gears mounted in the casing, compensating gearing between the opposing gears, the main gears being shiftable axially during relative rotation of the main gears and the compensating gearing, the main gears being also provided with integral hubs and external spur gear teeth on said hubs and the casing being provided with internal annular spur gear teeth concentric with the former spur gear teeth, and interleaved disks between each of the main gears and the opposing face of the casing, one set of disks having peripheral gear teeth interlocked with the internal gear teeth and the other set having internal gear teeth interlocked with the external spur gear teeth of the companion main gear, substantially as and for the purpose specified.

In testimony whereof, I have hereunto signed my name, at Syracuse, in the county of Onondaga, and State of New York, this 14th day of February, 1918.

GEORGE C. CARHART.